N. J. McGOFFIN.
VEGETABLE SEPARATOR.
APPLICATION FILED JULY 6, 1908.
926,281.
Patented June 29, 1909.
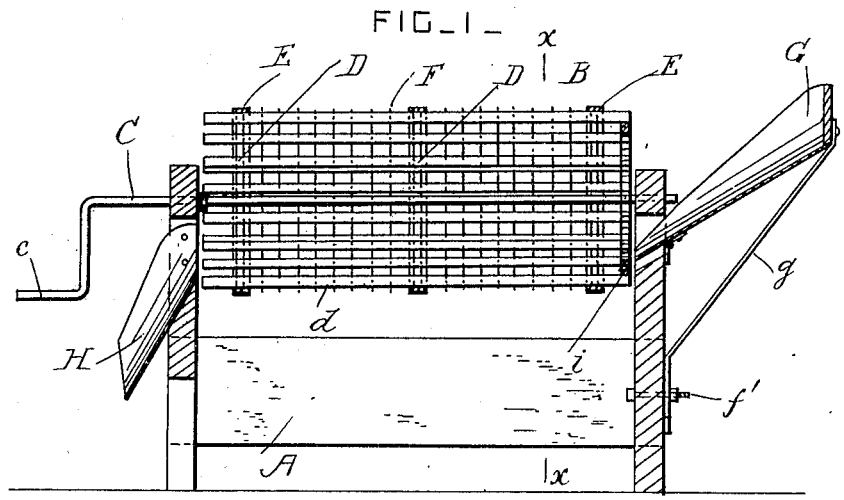
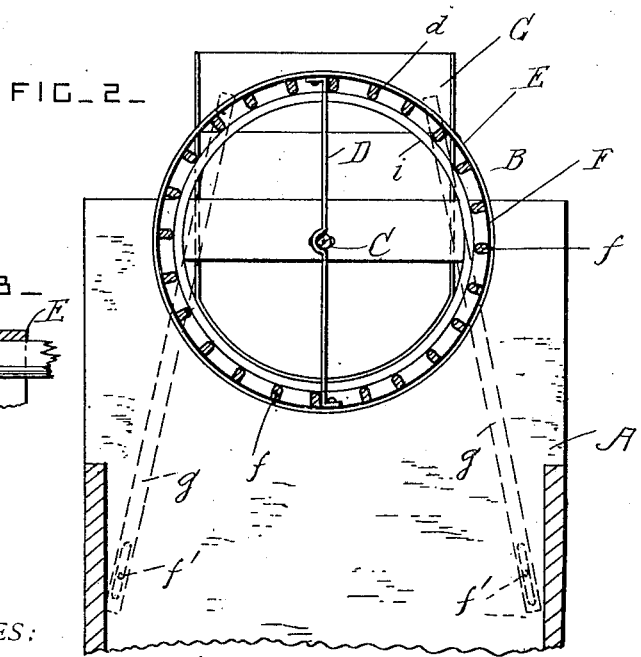
WITNESSES:
INVENTOR
Nathaniel J. McGoffin
BY
Herbert W. Jenner.
Attorney

UNITED STATES PATENT OFFICE.

NATHANIEL J. McGOFFIN, OF SPEARFISH, SOUTH DAKOTA.

VEGETABLE-SEPARATOR.

No. 926,281.  Specification of Letters Patent.  Patented June 29, 1909.

Application filed July 6, 1908. Serial No. 442,190.

*To all whom it may concern:*

Be it known that I, NATHANIEL J. McGOFFIN, a citizen of the United States, residing at Spearfish, in the county of Lawrence and State of South Dakota, have invented new and useful Improvements in Vegetable-Separators, of which the following is a specification.

This invention relates to machines for grading potatoes and other similar vegetables, and for removing sprouts from the potatoes; and it consists of a cylindrical screen constructed as hereinafter fully described and claimed.

In the drawings, Figure 1 is a longitudinal section through a potato separator constructed according to this invention. Fig. 2 is a cross-section through the screen, taken on the line x—x in Fig. 1, and drawn to a larger scale. Fig. 3 is a cross-section through a wire F and a ring E, showing a portion of one of the bars d.

A, is a frame of the machine which is of any approved construction.

B is a cylindrical screen which is journaled in the frame in a slightly inclined position.

C is the driving-shaft, one end portion of which is provided with a crank-handle c for revolving it, but any other approved means may be provided for revolving the screen in carrying out this invention.

D are arms secured to the shaft C, and to rings E which form a portion of the periphery of the screen. Any desired number of rings and arms may be used, but three rings are found to be satisfactory. The periphery of the screen is provided with a series of longitudinal parallel bars d. These bars are preferably formed of wood, and they are secured to the inside surfaces of the rings E. The inner faces of the bars are rounded over so that they have no sharp angles or corners which might injure the potatoes.

F are parallel hoops of wire arranged over bars d, and secured to them by staples f. The rectangular spaces formed between the bars d and the hoops F, are arranged so that all potatoes below a prearranged size will fall through them.

G, is a feed-hopper at the higher end of the cylindrical screen. The front end portion of this hopper is hinged or pivoted to the frame in any approved manner, and its rear end portion is supported by adjustable arms g, so that the angle of the bottom of the hopper can be varied. The arms g, are connected to the frame screws f'', and the arms are provided with slots which are slidable over the said screws, when slackened, or they may have other approved means for adjusting them.

H is a chute at the lower end of the screen through which the larger potatoes are delivered into suitable receptacles. When the screen is revolved the sprouts on the potatoes are removed by the joint action of the longitudinal wooden bars and the wire hoops which encircle the said bars, and it is found that by having the bars of a prearranged size and by using wire of a prearranged gage, all the sprouts can be removed without scraping or otherwise injuring the skins of the potatoes. The wire hoops are formed of fine wire which will cut the sprouts off the potatoes as they come in contact with them, and the bars d are of greater depth than width so that the potatoes are carried upward in the drum and are dropped onto the wire rings so that the sprouts are cut off by impact against them. A guard ring i, is secured at the mouth of the screen inside the bars d, to prevent the potatoes from working out, and the feed of the potatoes is regulated by changing the angle of the feed-hopper to suit the speed with which the screen is driven.

What I claim is:

In a vegetable separator, the combination, with a supporting frame having a feed opening at one end and an outlet opening at the other end, of a driving shaft arranged in an inclined position and journaled in bearings in the frame above the said openings; a screen secured on the said shaft and comprising a series of rings, a series of longitudinal bars arranged at short distances apart with open spaces between them and secured inside the said rings, a series of wire hoops secured outside the said bars between the said rings, and a guard ring secured inside the said bars at the inlet end of the screen; and an adjustable feed hopper connected to the frame beyond one end of the driving shaft and projecting within the said feed opening.

In testimony whereof I have affixed my signature, in presence of two subscribing witnesses.

NATHANIEL J. McGOFFIN.

Witnesses:
JOHN MURRAY,
BLANCHE COLMAN.